(12) United States Patent
Kotecha et al.

(10) Patent No.: US 9,264,364 B2
(45) Date of Patent: Feb. 16, 2016

(54) TRANSMITTING DATA VIA A PRIVATE SUB-NETWORK OF A SERVICE PROVIDER NETWORK

(71) Applicant: Verizon Patent and Licensing Inc., Basking Ridge, NJ (US)

(72) Inventors: Lalit R. Kotecha, San Ramon, CA (US); Chris S. Neisinger, Danville, CA (US); Sagiv Draznin, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 238 days.

(21) Appl. No.: 13/950,767

(22) Filed: Jul. 25, 2013

(65) Prior Publication Data

US 2015/0029840 A1    Jan. 29, 2015

(51) Int. Cl.
*H04W 4/00* (2009.01)
*H04L 12/803* (2013.01)

(52) U.S. Cl.
CPC .................................. *H04L 47/122* (2013.01)

(58) Field of Classification Search
CPC . H04W 4/005; H04W 88/06; H04W 28/0215; H04W 28/0268
See application file for complete search history.

(56) References Cited

U.S. PATENT DOCUMENTS

| 8,264,958 | B1* | 9/2012 | Pankajakshan | 370/230.1 |
| 2011/0201267 | A1* | 8/2011 | Synnergren et al. | 455/3.01 |
| 2012/0057476 | A1* | 3/2012 | Chan et al. | 370/252 |
| 2013/0042011 | A1* | 2/2013 | Sugizaki et al. | 709/227 |
| 2014/0349660 | A1* | 11/2014 | Abdalla | 455/450 |

* cited by examiner

*Primary Examiner* — Gregory Sefcheck
*Assistant Examiner* — Jenkey Van (57) ABSTRACT

A first device may receive data associated with a second device from within a first network and independently of a second network. The second device may include a sensor or an application to form or process a data record. The first device may establish a bearer between the first device and a particular user device, of multiple user devices, in accordance with a bearer policy; and provide the data towards the particular user device via a first sub-network, of multiple sub-networks, of the second network and via the bearer. The first sub-network may be independent of a second sub-network of the multiple sub-networks. The second sub-network may permit user device data to be transmitted between the multiple user devices. The first sub-network and the second sub-network may consume different levels of network resources.

20 Claims, 7 Drawing Sheets

TRANSMITTING DATA VIA A PRIVATE SUB-NETWORK OF A SERVICE PROVIDER NETWORK

BACKGROUND

Data flows are sometimes transmitted over a network, such as a cellular network, to data requestor, data repository, an application server, and/or some other location. Transmitting data flows over the cellular network can be costly, particularly, when a provider, associated with the cellular network, provides greater network resources than is needed to transmit the data flows. Also, access of the cellular network via individual client devices can be costly when a service provider, associated with the cellular network, charges for cellular network access of each client device.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide a private sub-network (hereinafter referred to as a "private network") within a service provider network to transmit data to/from multiple client devices (e.g., machine-to-machine (M2M) devices and/or some other type of client devices). In some implementations, the private network may prevent direct access of the client devices and of data gathered by the client devices, thereby improving security of the client devices and the security of the data. In some implementations, the private network may include bearers that that provide sufficient network resources to transmit data to/from the client devices without providing excess network resources that may not be needed to transmit the data.

Figure 1:
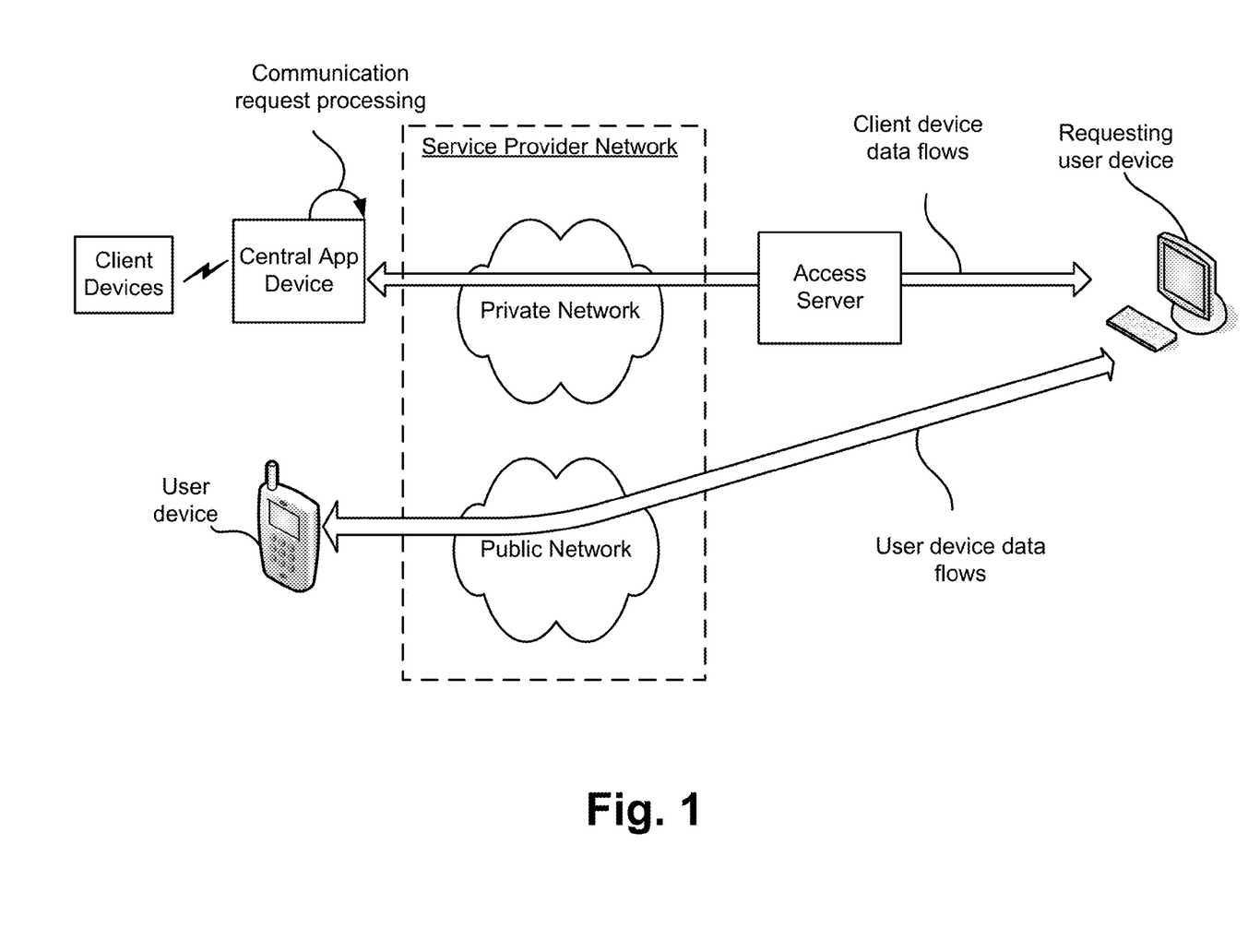
FIG. 1 illustrates an example overview of an implementation described herein.

FIG. 1 illustrates an example implementation as described herein. As shown in FIG. 1, data may be transmitted via a public sub-network (hereinafter referred to as a "pubic network") and/or via private network associated with a service provider network (e.g., a cellular network). In some implementations, the public network may be used to transmit user device data to/from user devices connected to the service provider network. In some implementations, the private network may be used to transmit client device data to/from multiple client devices via a central application (app) device. In some implementations, the private network and the public network may be independent from each other (e.g., the private network may not be directly accessible from the public network, and the public network may not be directly accessible from the private network) and may have separate uses. That is, client device data may not be transmitted via the public account and user device data may not be transmitted via the private network.

In some implementations, the private network may provide fewer network resources than the public network, while providing sufficient network resources to transmit data to/from the client devices. For example, client device data (e.g., data relating to data gathered by client devices and/or processed by associated app devices), may be require fewer network resources for transmission than data associated with user devices.

In some implementations, an access server may receive a request (e.g., from a requesting user device) to communicate with the central app device (e.g., via a portal or via some other technique) in order to receive data gathered by one or more client devices connected to the central app device, provision the client devices, send a control instruction to the client devices, and/or communicate with the client devices in some other manner. Based on receiving the request the access server may provide the request to the central app device via the private network. In some implementations, the central app device may receive the request, and may communicate with the one or more client devices to process the request within a local sensor network connecting the one or more client devices and the central app device. In some implementations, the central app device may form a response to the request, and may provide the response to the requesting user device via the private network.

As shown in FIG. 1, client device data (e.g., data relating to data gathered by the client devices) may be transmitted via the private network instead of via the public network. As described above, the private network may provide fewer network resources than the public network, while providing sufficient network resources to transmit the client device data. As a result, network load on the service provider network may be reduced by transmitting the client device data via a private network that provides fewer network resources than the public network resources without degrading the transmission of the client device data.

Figure 2:
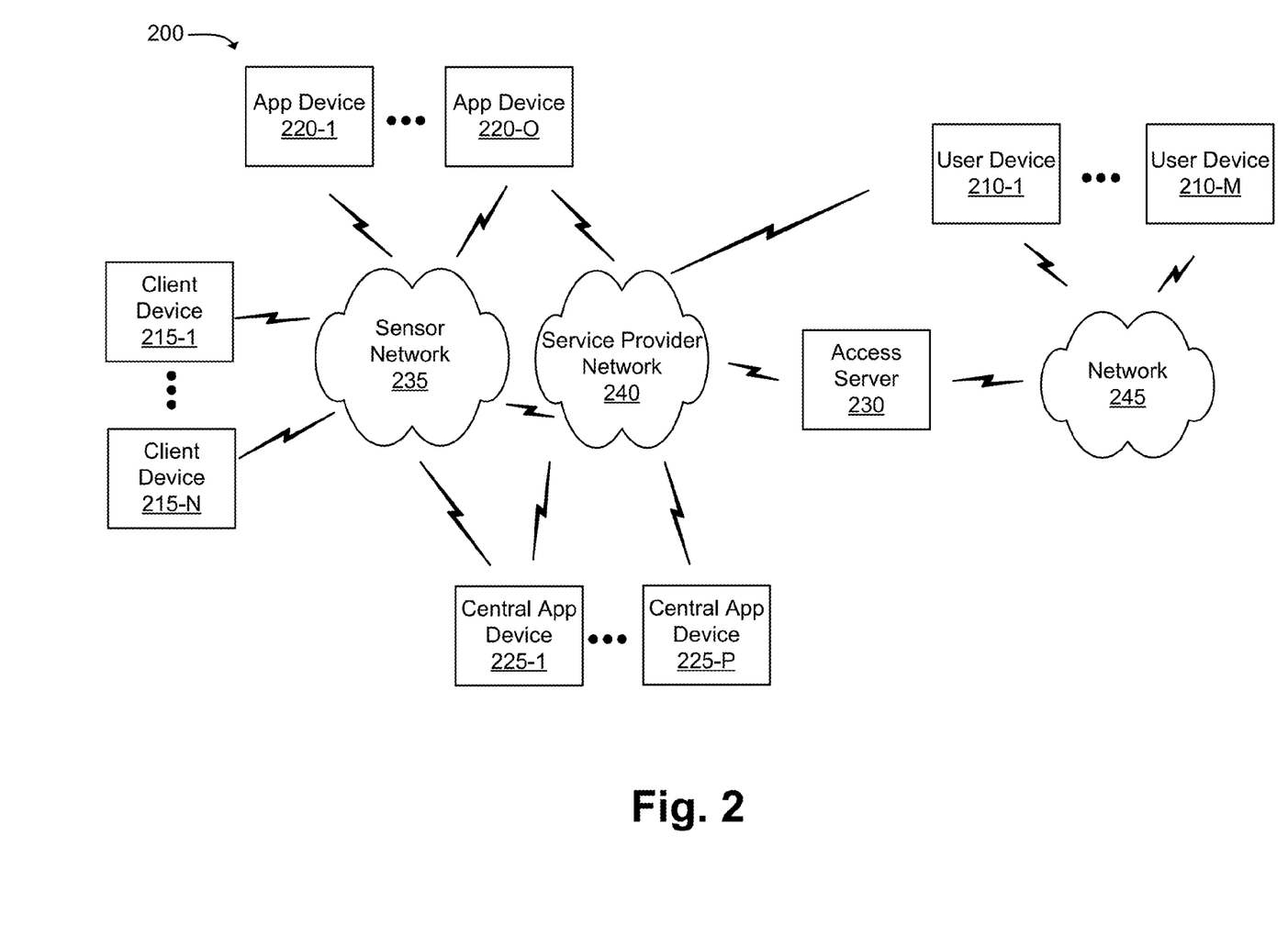
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1, . . . , 210-M (where M≥1), client devices 215-1 . . . , 215-N (where N≥1), application (app) devices 220-1, . . . , 220-0 (where O≥1), central app devices 225-1, . . . 225-P (where P≥1), access server 230, sensor network 235, service provider network 240, and network 245.

User device 210 may include a device capable of communicating via a network, such as service provider network 240 and/or network 245. For example, user device 210 may correspond to a mobile communication device (e.g., a smart phone or a personal digital assistant (PDA)), a portable computer device (e.g., a laptop or a tablet computer), a desktop computing device, a server device, or some other computing device.

In some implementations, user device 210 may provide a communication request. In some implementations, the communication request may include a request for data gathered by one or more client devices 215 and/or processed by one or more app devices 220. Additionally, or alternatively, the communication request may include a control instruction for client device 215. For example, the control instruction may include an instruction to direct the one or more client devices 215 to perform a task (e.g., adjust a configuration or orientation of client device 215, cause client device 215 to gather and/or transmit data at particular times, capture an image, capture audio, trigger a switch/actuator, and/or perform some other task).

In some implementations, the control instruction may include a one-time instruction to perform a task, or a recurring instruction to perform a task (e.g., at particular times, based on the occurrence of an event as identified by client device 215 and/or app device 220, etc.). Additionally, or alternatively, the communication request may include some other type of instruction relating to data gathered by one or more client devices 215. In some implementations, user device 210 may provide the communication request via an application programming interface (API), a web portal, or the like.

In some implementations, user device 210 may correspond to a web server device that may receive data gathered by client device 215 and/or processed by app device 220 and/or central app device 225 and may store the data for publishing to a web site or the like.

In some implementations, user device 210 may correspond to an operator user device 210 to provide provisioning information to central app device 225 to direct central app device 225 to provision client device 215 and/or app device 220 (e.g., to register client device 215 and/or app device 220 with a particular entity, such as a user, an organization, a company, a facility, etc.). In some implementations, user device 210 may provide provisioning information for multiple client devices 215 and/or app devices 220 to direct central app device 225 to concurrently provision multiple client devices 215 and/or app devices 220.

Client device 215 may include one or more sensors capable of communicating via a network. For example, client device 215 may include an M2M device, a network device (e.g., a modem, a switch, a gateway, etc.), a sensing device, a processing device, a metering device, a switch, an actuator, a camera, a timer, a signal detection device (e.g., to detect the presence of a signal, such as Bluetooth signal, an infrared signal, etc.), and/or some other type of device. In some implementations, client device 215 may gather data and form data record associated with the data. For example, data record may include a temperature measurement, a resource usage measurement, a motion detection indication, an object detection indication, a facility intrusion detection indication, or some other measurement and/or indication.

In some implementations, each data record may include a timestamp, information identifying a particular sensing/metering device of client device 215 used to gather the data in the data record, information regarding a particular product associated with the data, information regarding a particular facility associated with the data, information regarding a particular geographic location associated with the data, and/or some other information regarding the data. Additionally, or alternatively, the data record may include a computer file, such as a video file, an image file, an audio file, a text file, or the like.

In some implementations, data records may be used to aid in an analysis. For example, the data records may be used to aid in a sales trend analysis, a resource usage analysis, a product interest level trend analysis (e.g., to provide targeted advertising based on product interest), and/or some other type of analysis. Additionally, or alternatively, the data records may be used for some other purpose. For example, the data records may be used to alert a user of the occurrence of an event (e.g., a facility intrusion event, an event that identifies when resources have dropped below a particular threshold, and/or some other type of event).

In some implementations, client device 215 may further include a network device to provide data (including the processed data) towards app device 220 via sensor network 235.

In some implementations, client device 215 may receive a control instruction from app device 220 (e.g., as part of a communication request provided by user device 210). In some implementations, the control instruction may cause client device 215 to trigger a switch, an actuator, an image capturing device, or some other type of device associated with client device 215. In some implementations, client device 215 may be provisioned to gather data using particular sensor devices to form data records, provide the data to particular app devices 220 for processing, or perform some other task related to the gathering and transmission of data records formed by client device 215.

App device 220 may include a computing device, such as a server device, a desktop computing device, a portable computing device (e.g., a laptop, a tablet, a mobile phone, etc.), an M2M device, and/or some other type of computing device. In some implementations, app device 220 may include one or more applications that receive data gathered by a sensor of client device 215 (e.g., via sensor network 235) and may form processed data associated with the data. For example, the processed data may correspond to data analysis associated with the data, such as a temperature trend analysis, an inventory analysis, a sales trend analysis, etc. In some implementations, app device 220 may provide a control instruction to client device 215. In some implementations, app device 220 may be accessed via service provider network 240 (e.g., to provide security in accessing app device 220). In some implementations, app device 220 may be provisioned to process data, gathered by client device 215, using a particular application/algorithm to form processed data and to provide the processed data to central app device 225. In some implementations, client device 215 and app device 220 may be integrated together as part of an M2M device.

Central app device 225 may include a server device or a collection of server devices. In some implementations, central app device 225 may process a communication request received from user device 210. In some implementations, central app device 225 may communicate with multiple client devices 215 and/or multiple app devices 220 in order to process a communication request and/or to provision multiple client devices 215 and/or multiple app devices 220. For example (e.g., when the communication request includes a request for data gathered by multiple client devices 215), central app device 225 may identify particular app devices 220 and/or particular client devices 215 associated with the data, receive the data from the particular app devices 220 and/or particular client devices 215, and provide the data to user device 210 as a response to the communication request (e.g., via access server 230). In some implementations (e.g., when the communication request includes control instructions for multiple client devices 215 to perform a task based on processed data formed by app devices 220), central app device 225 may provide the control instructions to the multiple app devices 220 to cause the multiple client devices 215 to perform the task.

In some implementations, central app device 225 may receive provisioning information for app devices 220 and/or client devices 215 to provision app devices 220. In some implementations, communications between client devices 215, app device 220, and/or central app device 225 (e.g., to process the communication request and/or to provision app devices 220 and/or client devices 215) may occur within sensor network 235, thereby reducing network load on service provider network 240.

In some implementations, central app device 225 may store client device data (e.g., data gathered and/or processed by client device 215 and/or app device 220) and may provide the client device data (e.g., via a private network of service provider network 240) to user device 210. For example, the client device data may include a response to a communication request. In some implementations, central app device 225 may store transmission instructions to automatically provide the client device data independently of receiving a communication request. For example, central app device 225 may store transmission instructions to provide the client device data at off-peak times (to reduce load on service provider network 240 at peak times).

In some implementations, central app device 225 may connect to service provider network 240 via a private network and via bearers that provide particular network resources that are sufficient to provide the client device data and/or responses to communication requests without providing excess network resources that may not be needed to provide the client device data and/or responses to the communication requests.

Access server 230 may include a server device or a collection of server devices. In some implementations, access server 230 may receive a communication request, from user device 210, to communicate with client device 215. In some implementations, access server 230 may authenticate user device 210 based on receiving the communication request and may provide the communication request, on behalf of user device 210, to central app device 225 (e.g., to prevent direct access of central app device 225 by user device 210). In some implementations, access server 230 may select a particular central app device 225 to which to provide the communication request based on app devices 220 and/or client devices 215 associated with the communication request and connected to the particular central app device 225.

Sensor network 235 may include one or more wired and/or wireless networks. For example, sensor network 235 may include a Bluetooth network, a near-field communications (NFC) network, a ZigBee network, an infrared network, a radio frequency (RF) network, and/or a public land mobile network (PLMN), Additionally, or alternatively, sensor network 235 may include a local area network (LAN), a wireless LAN (WLAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, or a combination of these or other types of networks.

Service provider network 240 may include one or more wired and/or wireless networks. For example, service provider network 240 may include a PLMN, and/or a cellular network (e.g., a second generation (2G) network, a third generation (3G) network, a fourth generation (4G) network, a fifth generation (5G) network, a long term evolution (LTE) network, etc.). Additionally, or alternatively, service provider network 240 may include a LAN, a WLAN, a WAN, a MAN, a telephone network (e.g., the PSTN), an ad hoc network, a managed IP network, a virtual private network (VPN), an intranet, the Internet, a fiber optic-based network, or a combination of these or other types of networks.

In some implementations, service provider network 240 may include a public network and a private network. In some implementations, the public network and the private network may each include an evolved packet core (EPC) having network devices, such as a serving gateway (SGW), a packet data network (PDN) gateway (PGW), a mobile management entity (MME) device, and/or some other network device to transmit data to/from user device 210, client device 215, app device 220, central app device 225, and/or access server 230. In some implementations, the public network and the private network may each include a home subscriber server (HSS)/authentication, authorization, accounting (AAA) server (HSS/AAA server) to store account related information, subscription information, and/or authorization information to allow user devices 210 to access service provider network 240 and/or client devices 215. In some implementations, the public network and the private network may each include a policy and charging rules function (PCRF) to enforce connection and/or bearer policies for bearers used to transmit data. In some implementations, the public network and/or the private network may include physical devices and/or virtual elements that function as physical devices.

In some implementations, the private network may prevent direct access of client device 215, app device 220, and/or central app device 225 (e.g., by user device 210). For example, the private network may communicate with an authorized device (e.g., access server 230) such that access server 230 may provide a communication request (e.g., provided by user device 210) to central app device 225 for processing.

In some implementations, service provider network 240 may include a base station, such as an eNodeB (eNB) device or some other type of network device to transmit data to/from network 245 (e.g., via SGWs and PGWs associated with public and private networks of service provider network 245). In some implementations, the base station may send traffic to and/or receive traffic from user device 210, app device 220, and/or central app device 225 via an air interface. In some implementations, the base station may be associated with a radio access network (RAN).

Network 245 may include one or more wired and/or wireless networks. For example, network 250 may include a cellular network, and/or a PLMN. Additionally, or alternatively, network 245 may include a LAN, a WLAN, a WAN, a MAN, a telephone network (e.g., the PSTN), an ad hoc network, a managed IP network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
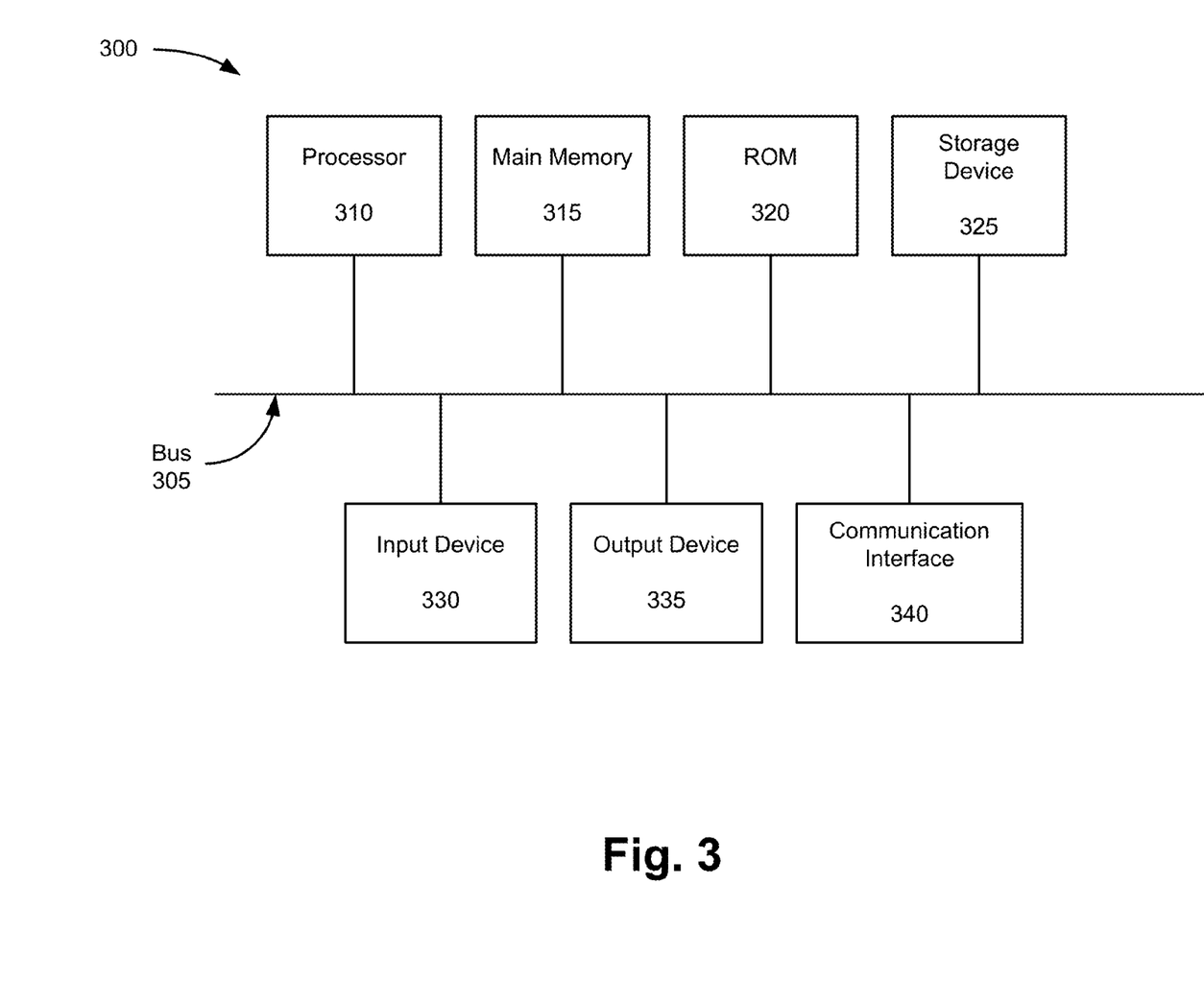
FIG. 3 illustrates example components of a device that may be used within the environment of FIG. 2.

FIG. 3 illustrates example components of a device 300 that may be used within environment 200 of FIG. 2. Device 300 may correspond to user device 210, client device 215, app device 220, central app device 225, and/or access server 230. Each of user device 210, client device 215, app device 220, central app device 225, and/or access server 230 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
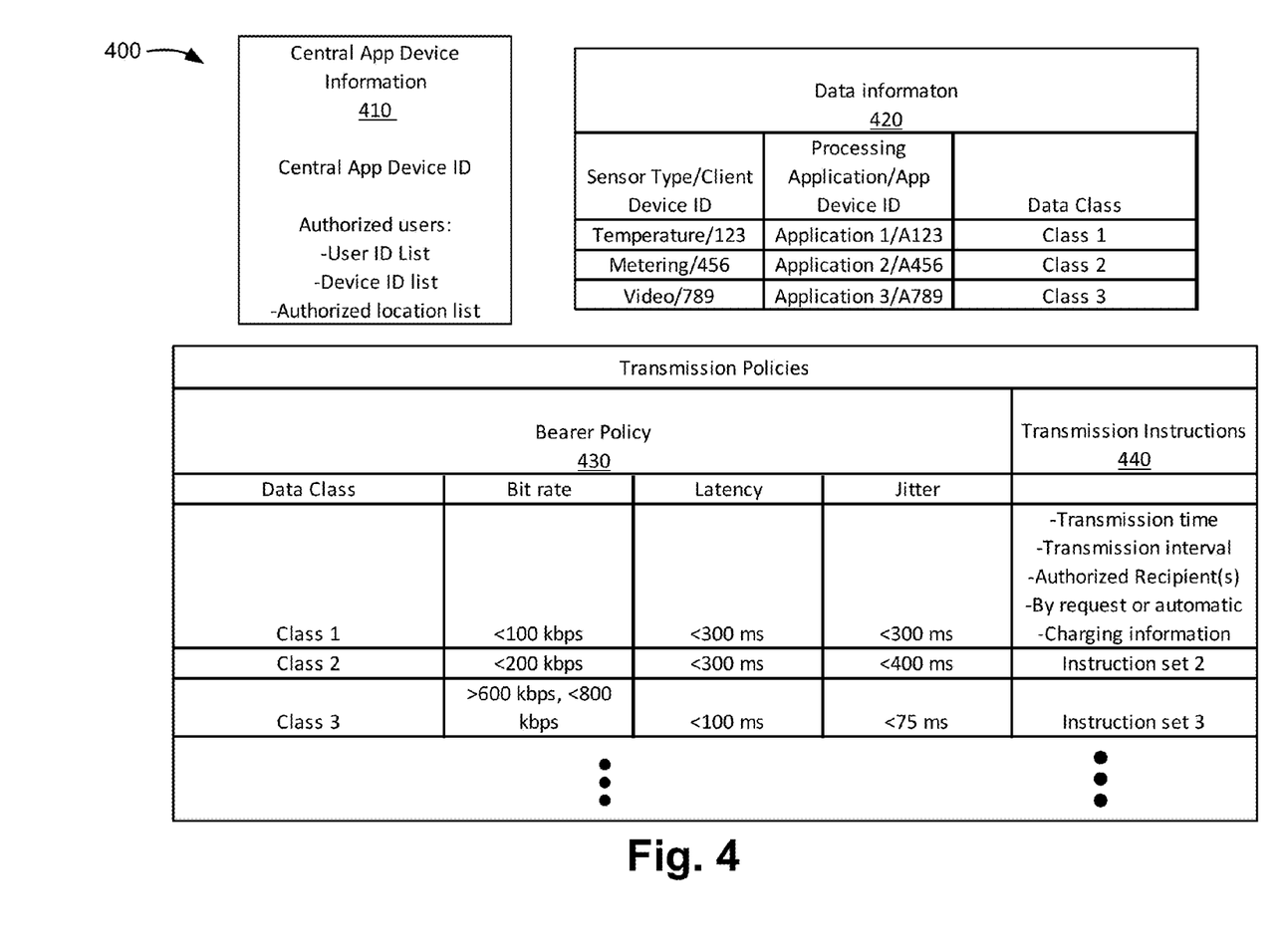
FIG. 4 illustrates an example data structure that may be stored by one or more devices in the environment of FIG. 2.

FIG. 4 illustrates an example data structure 400 that may be stored by one or more devices in environment 200, such as central app device 225. In some implementations, data structure 400 may be stored in a memory of central app device 225. In some implementations, data structure 400 may be stored in a memory separate from, but accessible by, central app device 225. In some implementations, data structure 400 may be stored by some other device in environment 200, such as user device 210, client device 215, app device 220, and/or access server 230.

As shown in FIG. 4, data structure 400 may include central app device information field 410, data information field 420, bearer policy field 430, and transmission instructions field 440.

Central app device information field 410 may include information that identifies a particular central app device 225 associated with a particular instance of data structure 400. For example, central app device information field 410 may store an identifier of central app device 225 (e.g., a serial number, a broadcast identifier, a network address, or the like). Additionally, or alternatively, central app device information field 410 may store information that identifies authorization information that access server 230 may use to authorize user device 210 to communicate with central app device 225 (e.g., to provide a communication request having a request for data gathered/processed by client device 215 and/or app device 220, a control instruction for client device 215, etc.). For example, central app device information field 410 may include a list of user IDs, a list of device IDs, a list of geographic locations, and/or some other information/list that may be used to authorize user device 210 to communicate with central app device 225. In some implementations, the lists may be white lists and/or black lists.

As an example, assume that user device 210 provides a communication request to access server 230 to request to communicate with central app device 225. In some implementations, the communication request may include a user ID, a device ID, information identifying a location of user device 210, and/or some other authorization/authentication related information (e.g., biometrics information, a security key, a password, etc.). Based on the information included in the communication request, central app device 225 may authorize user device 210 to communicate with central app device 225 when the information included in the communication request matches the information stored by central app device information field 410. In some implementations (e.g., when less than all of the information in the communication request matches the information stored by central app device information field 410), central app device 225 may allow partial access (e.g., to allow user device 210 to receive a particular subset of data gathered/processed by client device 215 and/or app device 220) or may deny access to data gathered/processed by client device 215 and/or app device 220 completely.

In some implementations, central app device information field 410 may also include information identifying tasks that user device 210 may perform. For example, central app device information field 410 may identify particular user devices 210 that may provide a particular control instruction and/or a particular management instruction to client device 215. Additionally, or alternatively, central app device information field 410 may identify particular user devices 210 that may provide provisioning information and/or updates to provisioning information for client device 215 and/or app device 220 (e.g., data gathering instructions, processing instructions, etc.).

Data information field 420 may store information identifying network topology associated with sensor network 235. Further, data information field 420 may store information identifying one or more sensor types implemented by client device 215, an ID of client device 215, a data class associated with data gathered by client device 215, an ID of an app device 220 used to process data gathered by client device 215, information identifying an application used by app device 220 to process the data, and/or some other information associated with data gathered by client device 215 and/or processed by app device 220.

For example, assume that the client device 215 having the ID 123 includes a temperature sensor. Further, assume that data gathered by the temperature sensor is categorized as class 1 data. Further, assume that the client device 215 having the ID 123 is to provide the data to the app device 220 having the ID A123 and that the app device 220 having the ID A123 is to use application 1 to process data gathered by the temperature sensor. Given these assumptions, data information field 420 may store information to identify that client device 215 having the ID 123 includes a temperature sensor, that the data gathered by the temperature sensor is categorized as class 1 data, that the data is processed using application 1 by the app device 220 having the ID A123. As described below, the data class may correspond to a particular transmission policy. That is, class 1 data may be associated with a different transmission policy than class 2 data.

Bearer policy field 430 and transmission instructions field 440 may store transmission policies for the transmission of client device data (e.g., data gathered by client device 215 and/or processed by app device 220). In some implementations, the client device data may be transmitted via a private network of service provider network 240. As shown in FIG. 4, a transmission policy may be based on a data class. Bearer policy field 430 may store information identifying how data, corresponding to the transmission of client device data, is to be treated (e.g., network resources that may be provided to transmit the data). For example, bearer policy field 430 may store information that identifies Quality of Service (QoS) policies for a bearer that is to be used to transmit the data.

In some implementations, central app device 225 may establish a particular bearer to transmit data based on information stored by bearer policy field 430 and based on a class of the data. As an example, assume that class 1 data is to be transmitted via a bearer that provides less than a 100 kilobits per second (kbps) bit rate, less than 300 ms of latency, and less than 300 ms of jitter. Given these assumptions, bearer policy field 430 may store information that identifies that central app device 225 is to establish, for class 1 data, a bearer that provides less than a 100 kilobits per second (kbps) bit rate, less than 300 milliseconds (ms) of latency, and less than 300 ms of jitter. As described in greater detail below, central app device 225 may establish the bearer by signaling information for the bearer to a PCRF associated with a private network of service provider network 240.

Transmission instructions field 440 may store information that identifies instructions for the transmission of client device data. For example, transmission instructions field 440 may store information that identifies a time at which client device data is to be transmitted, an interval (e.g., a frequency) at which the client device data is to be transmitted, a recipient that may receive/access the client device data (e.g., based on an IP address of the recipient, a short message service (SMS) address of the recipient, an e-mail address of the recipient, or the like), and whether the client device data is to be provided based on receiving a request or provided automatically. For example, the client device data may be provided automatically at a particular time and/or at a particular frequency. Additionally, or alternatively, the client device data may be provided based on an alert that is triggered when the value of the client device data satisfies a particular threshold.

As an example, an alert may trigger when a temperature sensor detects a temperature that exceeds or drops below a particular threshold. Additionally, or alternatively, the alert may trigger when a motion detector detects a motion, when a meter detects that a resource level drops below a particular threshold, when a facility alarm switch is triggered based on unauthorized access, etc. In some implementations, data may be transmitted at off-peak times in order to reduce network load and to reduce costs associated with transmitting the client device data.

As described above, transmission instructions field 440 may store information that identifies recipients that may receive/access client device data. For example, transmission instructions field 440 may store information identifying particular user devices 210 that may receive the client device data. Additionally, or alternatively, transmission instructions field 440 may store information that identifies that client device data of a particular class may be made public and may be made available to any user device 210.

In some implementations, transmission policies stored by bearer policy field 430 and/or transmission instructions field 440 may be based on a subscription level of a user of user device 210. For example, different bearer policies and different transmission instructions may be associated with users of different subscription levels.

In some implementations, an operator of user device 210 may communicate with central app device 225 (e.g., via a web portal) to select transmission polices based on charges that the operator of user device 210 may be willing to incur to receive the client device data. In some implementations, information stored by bearer policy field 430 and/or transmission instructions field 440 may be based on the transmission policies selected by the operator.

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible. For example, data structure 400 may store billing information that identifies charges associated with providing data gathered by client device 215. In some implementations, the charges may be based on the bearer policies and/or the transmission instructions. For example, the charges may be based on the time of day at which data is transmitted (e.g., lower charges for data transmitted at off-peak times).

Figure 5:
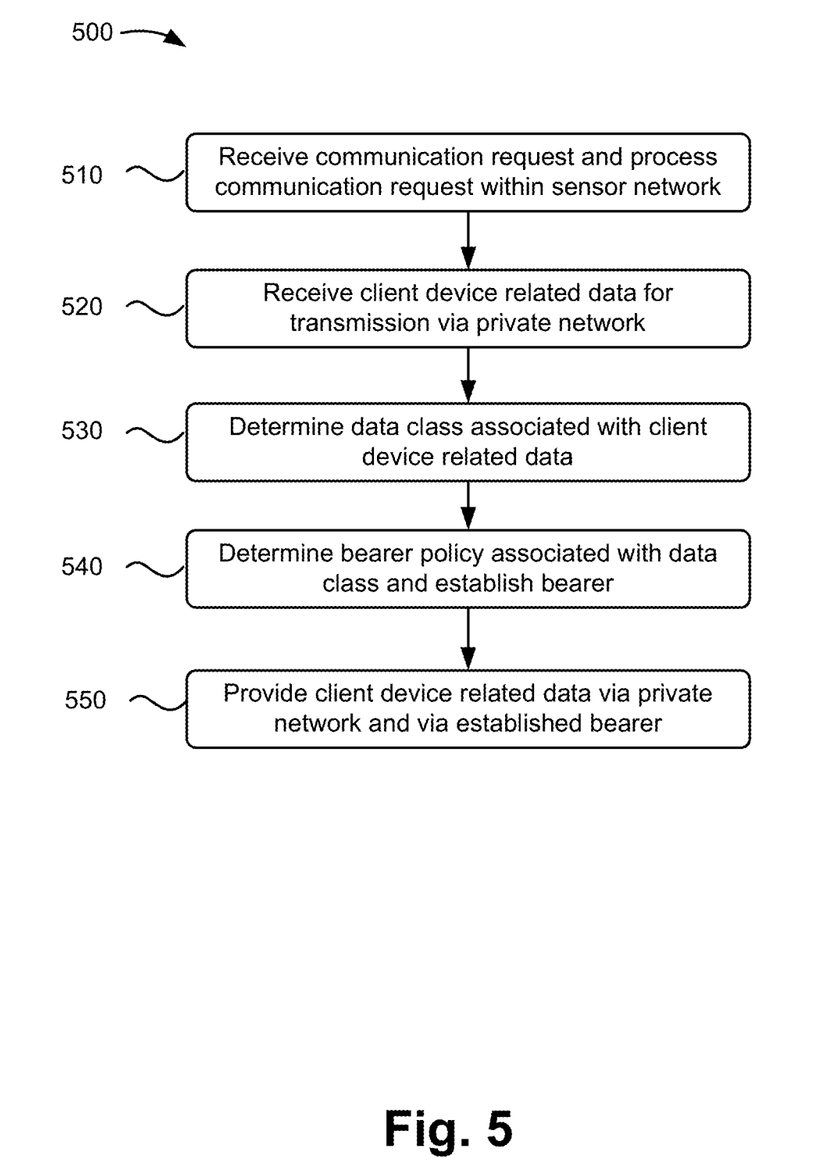
FIG. 5 illustrates a flowchart of an example process for providing data via a private network.

FIG. 5 illustrates a flowchart of an example process 500 for providing data via a private network. In one implementation, process 500 may be performed by one or more components of central app device 225. In another implementation, some or all of blocks of process 500 may be performed by one or more components of another device in environment 200 (e.g., user device 210, client device 215, app device 220, and/or access server 230), or a group of devices including or excluding central app device 225.

As shown in FIG. 5, process 500 may include receiving a communication request and processing the communication request within a sensor network (block 510). For example, central app device 225 may receive the communication request from user device 210 via access server 230 (e.g., via a web portal, an application, or some other technique). In some implementations, central app device 225 may receive the communication request via access server 230 based on access server 230 authorizing user device 210 to access service provider network 240 in order to communicate with central app device 225.

In some implementations, the communication request may include a request for client device data (e.g., data relating to data gathered by client device 215 and/or processed by app device 220). For example, the communication request may include a request for particular data records, formed by client device 215, that meet particular criteria. Additionally, or alternatively, the data request may include a request for an alert when data record, meeting the criteria, is gathered. Additionally, or alternatively, the data request may include a one-time request for data records and/or a request to receive data records at recurring intervals.

In some implementations, the communication request may include a control instruction to be provided to client device 215 via app device 220 (e.g., an instruction to adjust a sensor/metering device of client device 215, to adjust how data is gathered by client device 215, etc.). Additionally, or alternatively, the communication request may include updates to provisioning information associated with client device 215 and/or app device 220 stored by data structure 400 (e.g., updates to transmission policies, processing instructions, and/or devices authorized to communicate with client device 215 and/or app device 220). Additionally, or alternatively, the communication request may include some other communication/request associated with client device 215 and related to data records formed by client device 215.

In some implementations, central app device 225 may process the communication request within sensor network 235. For example, central app device 225 may identify one or more particular app devices 220 and/or client devices 215 that may be involved in processing the communication request (e.g., to receive client device data from the particular app devices and/or client devices 215). In some implementations, communications between client device 215, app device 220, and/or central app device 225 (e.g., communications relating to processing the communication request) may occur within sensor network 235, thereby reducing load on service provider network 240.

Process 500 may also include receiving client device data for transmission via a private network (block 520). For example, central app device 225 may receive the client device data from app device 220 and may prepare to transmit the client device data via the private network associated with service provider network 240. In some implementations, central app device 225 may prepare to transmit the client device data based on receiving the communication request. Additionally, or alternatively, central app device 225 may prepare to transmit the client device data based on a transmission instruction stored by transmission instructions field 440 (e.g., an instruction to transmit the client device data at particular times, such as off-peak times, an instruction to transmit the client device data based on an alert, etc.). As described above, central app device 225 may connect with the private network and may not connect with the public network such that client device data may be transmitted via the private network to reduce network load on service provider network 240.

In some implementations, the client device data may be received based on processing the communication request and may correspond to a response to the communication request (e.g., a response to a request data gathered by client device 215, processed data formed by app device 220, data records meeting particular criteria, a response to a control instruction that indicates that the control instruction has been received and executed, etc.).

Additionally, or alternatively, the client device data may be received without receiving a communication request. For example, the client device data may be received from app device 220 (e.g., data that may be automatically provided by app device 220 at particular times, data that may be automatically provided by app device 220 based on detecting an alert that may be triggered when the value of the data satisfies a particular threshold, etc.). In some implementations, the client device data may be continuously provided by app device 220 within sensor network 235 (e.g., such that central app device 225 may store the client device data and transmit the client device data via service provider network 240 at an off-peak time, in accordance with transmission instructions stored by transmission instructions field 440).

Process 500 may also include determining a data class associated with the client device data (block 530). For example, central app device 225 may determine the a data class based information stored by a header in one or more packets of the data that identifies an application associated with the client device data (e.g., an application used to provide and/or process the client device data). Further, central app device 225 may determine the a data class based on information stored by data information field 420 that identifies the a data class corresponding to the application associated with the client device data. Additionally, or alternatively, the a data class may be determined based on some other information.

Process 500 may further include determining a bearer policy associated with the a data class and establishing a bearer (block 540). For example, central app device 225 may determine the bearer policy, associated with the a data class, based on information stored by bearer policy field 430 that identifies the bearer policy corresponding to the a data class. In some implementations, central app device 225 may establish the bearer between central app device 225 and a recipient of the client device data by signaling information associated with the bearer policy and information identifying the recipient of the client device data to a PCRF associated with a private network of service provider network 240. Additionally, or alternatively, central app device 225 may establish the bearer by signaling information identifying the a data class to the PCRF such that the PCRF may identify the bearer policy corresponding to the a data class.

In some implementations, the information identifying the recipient of the client device data may include an identifier (ID), an IP address, a telephone number, or the like, of a user device 210 that provided the communication request or of a user device 210 that is to receive the client device data based on transmission instructions stored by transmission instructions field 440.

In some implementations, the PCRF may enforce the bearer policy by providing instructions to network devices of service provider network 240 (e.g., an SGW, a PGW, an MME, or the like), to minimize packet loss, to implement a packet delay budget, to provide a guaranteed bit rate (GBR), to provide a particular latency, and/or to perform other activities associated with enforcing the bearer policy. Additionally, or alternatively, the PCRF may implement a scheduling algorithm to schedule the transmission of the client device data based on the bearer policy. For example, the PCRF may implement a GBR scheduling algorithm, a round-robin scheduling algorithm, a best-effort scheduling algorithm, and/or some other type of scheduling algorithm.

In some implementations, central app device 225 may establish the bearer without involving the PCRF. For example, central app device 225 may provide the instructions to the network devices of service provider network 240 to enforce the bearer policy. Additionally, or alternatively, central app device 225 may implement the scheduling algorithm to schedule the transmission of the client device data based on the bearer policy.

Process 500 may also include providing the client device data via the private network and via the established bearer (block 550). For example, central app device 225 may provide the client device data based on receiving an indication from the PCRF of service provider network 240 that the bearer has been established. In some implementations, central app device 225 may encrypt the client device data and may provide the data via a secure bearer to prevent an unauthorized device from receiving the client device data.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

Figure 6:
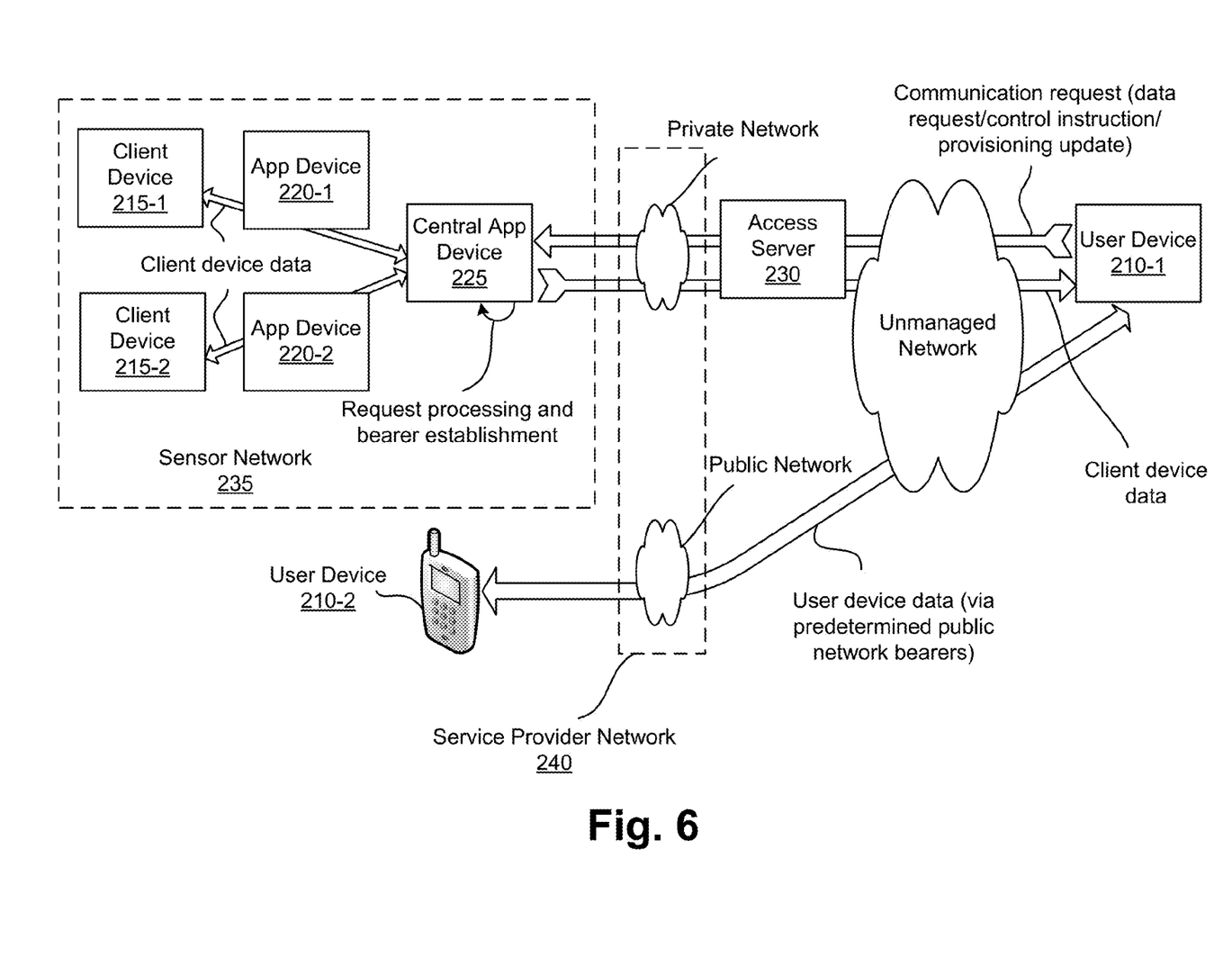
FIG. 6 illustrates an example implementation as described herein.

FIG. 6 illustrates an example implementation as described herein. As shown in FIG. 6, user device 210-1 may provide a communication request destined for central app device 225. In some implementations, access server 230 may receive the communication request via an unmanaged network (e.g., network 245), authorize user device 210-1 (e.g., based on authorization information included in the communication request and information stored by central app device information field 410), and provide the communication request to central app device 225 via a private network of service provider network 240 based on authorizing user device 210-1.

As further shown in FIG. 6, central app device 225 may process the communication request within sensor network 235. For example, central app device 225 may identify app devices 220 and client devices 215 involved with the communication request, such as app devices 220 and client devices 215 that may gather/process data requested by user device 210-1 via the communication request, a control instruction and/or a provisioning update for app devices 220 and/or client devices 215, etc. As an example, assume that central app device 225 identifies that app device 220-1, app device 220-2, client device 215-1, and client device 215-2 are involved with the communication request. Given this assumption, central app device 225 may communicate with app device 220-1, app device 220-2, client device 215-1, and client device 215-2 in order to receive client device data corresponding to a response to the communication request. Additionally, or alternatively, central app device 225 may receive the client device data independently of receiving the communication request. For example, central app device 225 may receive the client device data based on a transmission instruction that directs app device 220 to automatically provide the client device data to central app device 225 (e.g., to continuously provide client device data within sensor network 235 for storage by central app device 225).

In some implementations, central app device 225 may provide the client device data (e.g., based on receiving the communication request and/or based on a transmission instruction to provide the data at particular times or based on detecting an alert). For example, central app device 225 may identify a bearer policy based on a data class of the client device data and may transmit the client device data via the established bearer. Further, the established bearer may be used to receive communication requests from user device 210-1.

In some implementations, user device 210-1 may communicate with user device 210-2 via a public network using predetermined public network bearers. As further shown in FIG. 6, the client device data may be transmitted via the private network instead of via a public network of service provider network 240. As described above, the private network may provide fewer network resources than the public network, while providing sufficient network resources to transmit client device data to/from the client devices. As a result, network load on service provider network 240 may be reduced by transmitting client device data via a private network that provides fewer network resources than the public network resources without degrading the transmission of the client device data.

While a particular example is shown in FIG. 6, the above description is merely an example implementation. In practice, other examples are possible from what is described above in FIG. 6.

Figure 7A:
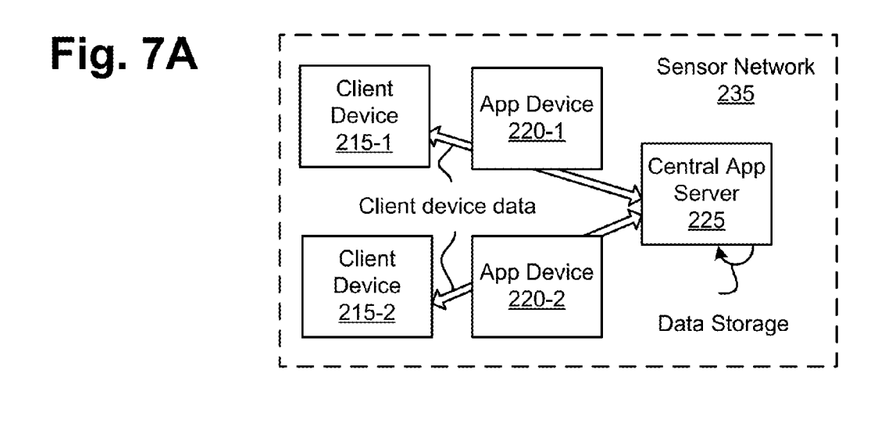
FIGS. 7A-7B illustrates an example implementation as described herein.
Figure 7B:
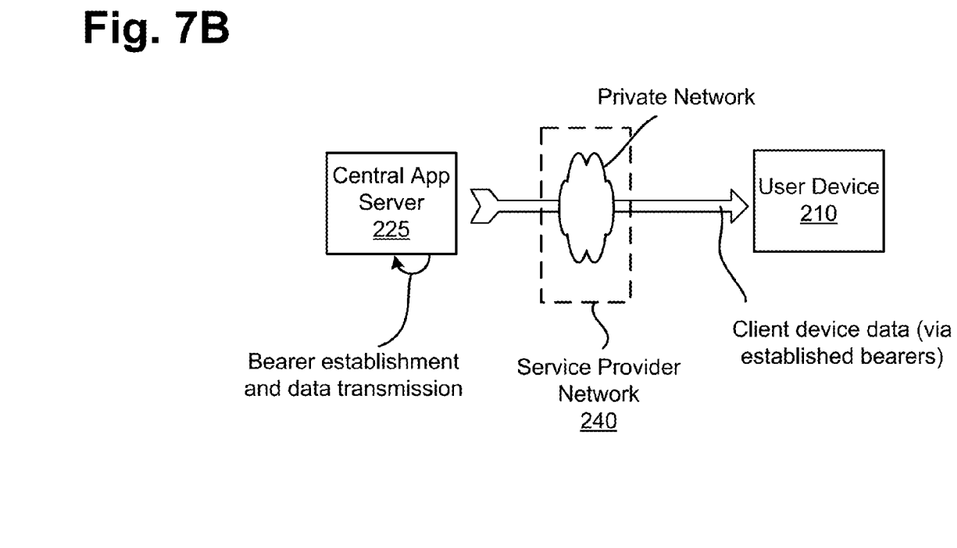

FIGS. 7A-7B illustrate an example implementation as described herein. In FIGS. 7A-7B, assume that central app device 225 continuously receives client device data from app device 220-1 and app device 220-2. For example, assume that central app device 225 receives client device data (e.g., data records) that identify resource usage measurements (e.g., power usage measurements, utility usage measurements, etc.). Further, assume that central app device 225 stores transmission instructions to store the data records and provide the data records to user device 210 at off-peak times. As shown in FIG. 7A, central app device 225 may receive the client device data within sensor network 235. That is, communications between client device 215-1, client device 215-2, app device 220-1, and app device 220-2 to gather, process, provide, and/or store the client device data may occur within sensor network 235 such that service provider network 240 may not bear network load associated with the communications between client device 215-1, client device 215-2, app device 220-1, and app device 220-2.

Referring to FIG. 7B, central app device 225 may provide the client device data (e.g., at a time specified by the transmission instructions). For example, at the time specified by the transmission instructions, central app device 225 may identify a bearer policy based on a data class of the client device data, establish a bearer based on the bearer policy, and provide the client device data towards user device 210 using the established bearer and via a private network of service provider network 240. As a result, service provider network 240 may be used to provide the client device data at off-peak times (e.g., when the client device data may not be immediately needed or requested) and using the private network that may consume fewer network resources than a public network of service provider network 240.

While a particular example is shown in FIGS. 7A-7B, the above description is merely an example implementation. In practice, other examples are possible from what is described above in FIGS. 7A-7B.

As described above, a private network, associated with service provider network 240, may consume fewer network resources than a public network of service provider network 240, while providing sufficient network resources to transmit client device data. As a result, network load on service provider network 240 may be reduced when central app device 225 transmits the client device data via the private network that consumes fewer network resources than the public network without degrading the transmission of the client device data. Further, client device 215, app device 220, and/or central app device 225 may communicate within sensor network 235, thereby reducing network load on service provider network 240, to process a communication request and/or store client device data for transmission at particular times (e.g., off-peak times).

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A system comprising:
a first device to:
  process a communication request from a particular user device of a plurality of user devices,
    the communication request being processed within a first network without being processed via a second network different than the first network,
    the second network including a service provider network;
  receive, based on processing the communication request and from within the first network, data associated with a second device,
    the data being received independently of the second network,
    the second device corresponding to a machine-to-machine device and including a sensor or an application to form or process a data record,
    the second device and the first device being included in the first network;
  establish a bearer between the first device and the particular user device in accordance with a bearer policy,
    the bearer policy being based on a class associated with the data and identifying a Quality of Service or a level of network resources to provide for a transmission of the data; and
  provide the data towards the particular user device via a first sub-network, of a plurality of sub-networks, of the second network and via the bearer,
    the first sub-network being independent of a second sub-network of the plurality of sub-networks,
    the second sub-network permitting user device data to be transmitted between the plurality of user devices,
    the first device being connected to the first sub-network without being connected to the second sub-network,
    the first sub-network consuming a level of network resources that is less than a level of network resources consumed by the second sub-network.

2. The method of claim 1, further comprising:
receiving the communication request from the particular user device via the second network; and
communicating with the second device, within the first network and without using the second network, to process the communication request and to receive the data.

3. The method of claim 1, further comprising:
determining the particular user device based on a transmission instruction stored by the first device,
  where providing the data towards the particular user device is based on determining the particular user device.

4. The method of claim 1, where the data includes a response to a control instruction for the second device or the data record formed or processed by the second device.

5. The method of claim 1, where the first network is a sensor network local to the first device and the second device, and where the second network is a service provider network.

6. The method of claim 1, where the second device is a machine-to-machine device.

7. The method of claim 1, further comprising:
storing the data based on receiving the data,
  where providing the data towards the particular user device includes providing the data towards the particular user device at a time corresponding to a transmission instruction stored by the first device.

8. A system comprising:
a first device to:
  process a communication request from a particular user device of a plurality of user devices,
    the communication request being processed within a first network without being processed via a second network different than the first network,
    the second network including a service provider network;
  receive, based on processing the communication request and from within the first network, data associated with a second device,
    the data being received independently of flail the second network,
    the second device corresponding to a machine-to-machine device and including a sensor or an application to form or process a data record,
    the second device and the first device being included in the first network;
  establish a bearer between the first device and the particular user device in accordance with a bearer policy; and
  provide the data towards the particular user device via a first sub-network, of a plurality of sub-networks, of the second network and via the bearer,
    the first sub-network being independent of a second sub-network of the plurality of sub-networks,
    the second sub-network permitting user device data to be transmitted between the plurality of user devices,
    the first device being connected to the first sub-network without being connected to the second sub-network,
    the first sub-network consuming a level of network resources that is less than a level of network resources consumed by the second sub-network.

9. The system of claim 8, where the first device is further to:
determine the class associated with the data,
where, when establishing the bearer between the first device and the particular user device, the first device is to establish the bearer based on determining the class associated with the data.

10. The system of claim 8, where the first device is further to:
- determine the particular user device based on a transmission instruction stored by the first device,
- where, when providing the data towards the particular user device, the first device is to provide the data towards the particular user device based on determining the particular user device.

11. The system of claim 8, where the first device is further to:
- receive the communication request from the particular user device via the second network; and
- communicate with the second device, within the first network and independently of the second network, to process the communication request and to receive the data.

12. The system of claim 8, where the data includes a response to a control instruction for the second device or the data record formed or processed by the second device.

13. The system of claim 8, where the first network is a sensor network,
- where the first sub-network corresponds to a private network of the service provider network, and
- where the second sub-network corresponds to a public network of the service provider network.

14. The system of claim 8, where the first device is further to:
- store the data based on receiving the data,
- where, when providing the data towards the particular user device, the first device is to provide the data towards the particular user device at a time corresponding to a transmission instruction stored by the first device.

15. A non-transitory computer-readable medium for storing instructions, the instructions comprising:
- a plurality of instructions which, when executed by one or more processors associated with a first device, cause the one or more processors to:
- process a communication request from a particular user device of a plurality of user devices,
  - the communication request being processed within a first network without being processed via a second network,
  - the first network being a sensor network and the second network being a service provider network;
- receive, based on processing the communication request and from within the first network, data associated with a second device,
  - the first device and the second device being included in the first network, and
  - the data being received independently of the second network,
  - the second device including a sensor or an application to form or process a data record;
- determine a class associated with the data;
- establish a bearer between the first device and the particular user device in accordance with a bearer policy,
  - the bearer policy being based on the class and identifying a Quality of Service or a level of network resources to provide for transmission of the data; and
- provide the data towards the particular user device via a first sub-network, of a plurality of sub-networks, of the second network and via the bearer;
  - the first sub-network being independent of a second sub-network of the plurality of sub-networks,
  - the second sub-network permitting user device data to be transmitted between the plurality of user devices,
  - the first device being connected to the first sub-network without being connected to the second sub-network,
  - the first sub-network and the second sub-network consuming different levels of network resources.

16. The non-transitory computer-readable medium of claim 15, where the plurality of instructions further cause the one or more processors to:
- receive the communication request from the particular user device via the second network; and
- communicate with the second device, within the first network and independently of the second network, to process the communication request and to receive the data.

17. The non-transitory computer-readable medium of claim 15, where the plurality of instructions further cause the one or more processors to:
- determine the particular user device based on a transmission instruction stored by the first device,
- where one or more instructions, of the plurality of instructions, to provide the data towards the particular user device cause the one or more processors to provide the data towards the particular user device based on determining the particular user device.

18. The non-transitory computer-readable medium of claim 15, where the data includes a response to a control instruction for the second device or the data record formed or processed by the second device.

19. The non-transitory computer-readable medium of claim 15, where the second device is a machine-to-machine device.

20. The non-transitory computer-readable medium of claim 15, where the plurality of instructions further cause the one or more processors to:
- store the data based on receiving the data,
- where one or more instructions, of the plurality of instructions, to provide the data towards the particular user device, cause the one or more processors to provide the data towards the particular user device at a time corresponding to a transmission instruction stored by the first device.

* * * * *